(12) United States Patent
Mall et al.

(10) Patent No.: US 8,136,111 B2
(45) Date of Patent: Mar. 13, 2012

(54) MANAGING EXECUTION OF MIXED WORKLOADS IN A SIMULTANEOUS MULTI-THREADED (SMT) ENABLED SYSTEM

(75) Inventors: Michael G. Mall, Round Rock, TX (US); James B. Moody, Austin, TX (US); Suresh E. Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1605 days.

(21) Appl. No.: 11/426,814

(22) Filed: Jun. 27, 2006

(65) Prior Publication Data

US 2007/0300227 A1 Dec. 27, 2007

(51) Int. Cl.
*G06F 9/46* (2006.01)
(52) U.S. Cl. ......................................... 718/102; 718/104
(58) Field of Classification Search ........................ None
See application file for complete search history.

(56) References Cited

U.S. PATENT DOCUMENTS

| | | | |
|---|---|---|---|
| 2004/0194094 A1 | 9/2004 | Qiu et al. | |
| 2004/0215932 A1* | 10/2004 | Burky et al. | 712/43 |
| 2004/0216101 A1 | 10/2004 | Burky et al. | |
| 2004/0216102 A1 | 10/2004 | Floyd | |
| 2004/0216120 A1 | 10/2004 | Burky et al. | |
| 2005/0138442 A1 | 6/2005 | Keller et al. | |
| 2006/0107264 A1* | 5/2006 | Schmidt et al. | 718/100 |

FOREIGN PATENT DOCUMENTS

JP  2005-266841  * 9/2005

* cited by examiner

*Primary Examiner* — Camquy Truong
(74) *Attorney, Agent, or Firm* — Matthew W. Baca; Amy J. Pattillo

(57) ABSTRACT

A SMT enabled processor system, having multiple processors each activated to interleave execution of multiple hardware threads on each processor, for ST workload, includes a kernel. The kernel of the SMT enabled processor system facilitates construction of an exclusive set of processors to simulate an ST mode for handling the tasks of the ST workload, wherein the ST workload runs more efficiently on single threaded processors. The kernel schedules the ST workload on the exclusive set of processors by selecting one hardware thread per processor within said exclusive set of processors to handle a separate one of the tasks of the ST workload, while requiring the remaining hardware threads per processor within the exclusive set to idle. The ST workload is executed on the SMT enabled processor system as if the exclusive set of processors run in ST mode, but without actually removing the remaining idle hardware threads per processor within the exclusive set of processors.

17 Claims, 6 Drawing Sheets

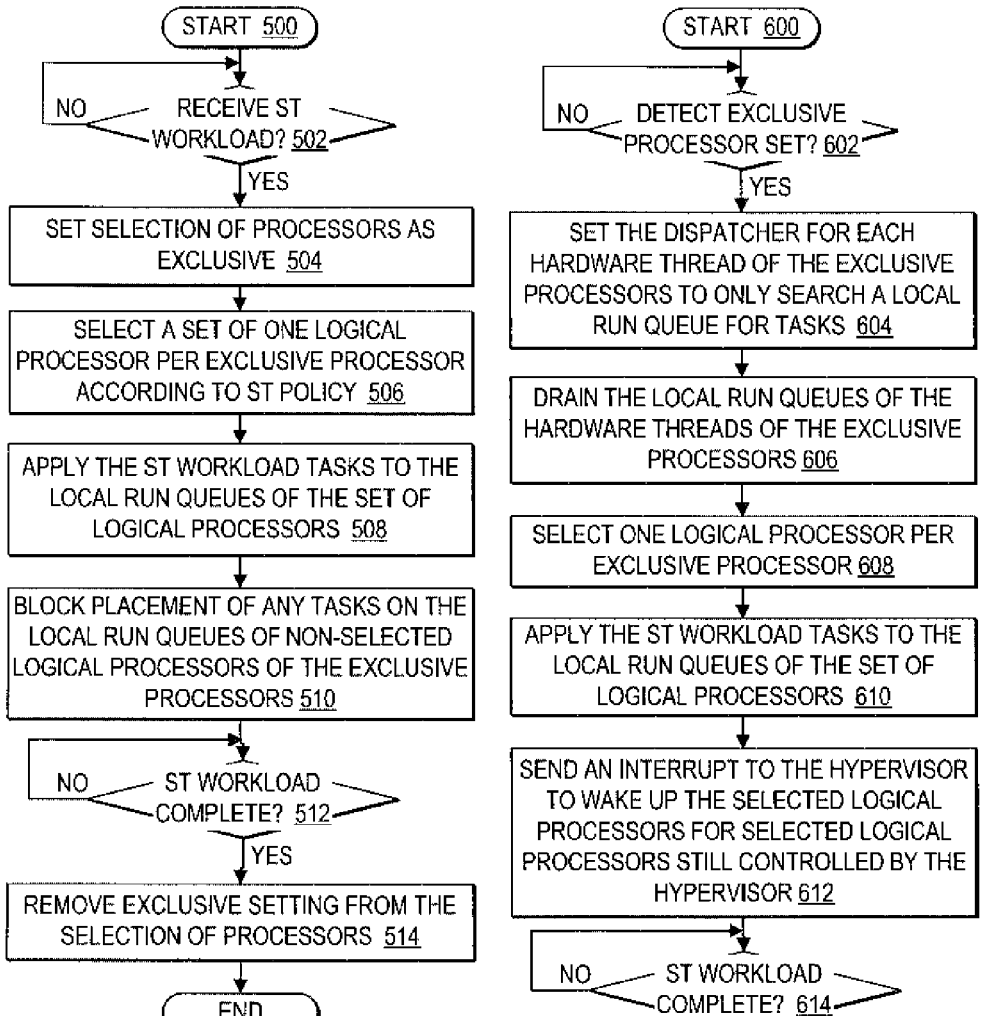

MANAGING EXECUTION OF MIXED WORKLOADS IN A SIMULTANEOUS MULTI-THREADED (SMT) ENABLED SYSTEM

BACKGROUND OF THE INVENTION

1. Technical Field

The present invention relates generally to processors and computing systems and in particular, to a simultaneous multi-threaded (SMT) processor. Further, the present invention relates to managing execution of single-threaded (ST) workloads and SMT workloads in a SMT enabled system without switching the processors of the system between ST mode and SMT mode.

2. Description of the Related Art

Improvement of computing technology requires improving the performance characteristics of computer systems that operate under dynamically changing load requirements. One method of improving the performance of a computer system is through use of multiple processors that share the processing load by executing portions of a computer program or separate computer programs in parallel. Another method of improving the performance of a computer system is by enabling multiple hardware threads to execute on each processor where each thread processes a different workload or a different portion of one or more workloads. In a processing system where multiple hardware threads are active, an operating system may support simultaneous multi-threading (SMT) where multiple threads run "simultaneously" on each processor. For a workload to run across the multiple threads, an operating system activates the multiple hardware threads for each processor in a SMT mode.

However, while enabling the SMT mode improves the execution time for some types of workloads, there are other types of workloads for which activating only one hardware thread per processor would be more efficient. For example, high performance computing (HPC) workloads, which require jobs to proceed at the same speed through each processor, perform more efficiently where only one hardware thread is active on each processor. To accommodate workloads that run more efficiently where only one hardware thread is active on each processor, the operating system may facilitate switching all the processors in the system from running in a SMT mode to a single-threaded (ST) mode. In an ST mode, there is only one hardware thread active on each processor. Therefore, to switch from SMT mode to ST mode, all but one hardware thread on each processor is removed at the processor level.

One limitation of an operating switching between SMT mode and ST mode based on the mode most efficient for the type of workload is that each mode switch requires a dynamic reconfiguration event per hardware thread being removed or activated at the processor level. A dynamic reconfiguration event is time consuming because hardware threads are represented by the operating system as logical processing units. Thus, removal or activation of each hardware thread requires separate interrupts at the hardware, operating system and application levels to actually disable hardware threads at the hardware level, to dynamically reconfigure the available logical processors to only one logical processor per physical processor, and to adapt all kernel extensions and applications to only bind to the reconfigured logical processors. Performing a dynamic reconfiguration event on each processor is further limited as the number of processors increases. For example, if each dynamic reconfiguration event takes three seconds per processor and there are 64 processors, each switch of the SMT enabled processors from ST mode to SMT mode or SMT mode to ST mode could take about 3 minutes.

Another limitation of an operating system switching between SMT mode and ST mode based on the mode most efficient for the type of workload is that the operating system runs all the processors in a system either in SMT mode or ST mode. Because the system operates in one mode or the other, when the system is enabled in SMT mode, even though processors may sit idle, an ST workload will wait until the workload processed in SMT mode is complete and the operating system switches from SMT mode to ST mode.

Therefore, in view of the foregoing, there is a need for a method, system, and program for running SMT workloads and ST workloads on a SMT enabled system, without switching between modes, but with comparable performance to running ST workloads in ST mode. In addition, there is a need for a method, system, and program for running mixed workloads of both SMT workloads and ST workloads concurrently on a SMT enabled system running in SMT mode.

SUMMARY OF THE INVENTION

Therefore, an embodiment of the invention provides improved management of a SMT enabled processing system. In particular, one embodiment of the invention provides a method, system, and program for managing execution of mixed ST workloads and SMT workloads in a SMT enabled system without switching the processors of the system between ST mode and SMT mode.

In one embodiment of the invention, in a SMT enabled processor system, for an ST workload, the kernel of the SMT enabled processor system facilitates construction of an exclusive set of processors to handle the tasks of the ST workload, wherein the ST workload runs more efficiently on single threaded processors. In addition, the kernel sets a separate dispatcher for each hardware thread of the exclusive set of processors to only execute work on each local run queue associated with each hardware thread of the exclusive set of processors. The kernel drains any tasks waiting one each local run queue associated with each hardware thread of the exclusive set of processors. Responsive to each hardware thread being placed in an idle mode without any tasks to perform, the kernel sets each hardware thread of the exclusive set of processors in a snooze mode, wherein only an interrupt awakens each hardware thread placed in snooze mode to search an associated local run queue for waiting tasks. The kernel schedules the ST workload on the exclusive set of processors by selecting one hardware thread per processor within said exclusive set of processors to handle a separate one of the tasks of the ST workload, while requiring the remaining hardware threads per processor within the exclusive set to idle. The ST workload is executed on the SMT enabled processor system as if each selected one hardware thread of each of the exclusive set of processors is running in ST mode without removing the remaining idle hardware threads per processor within the exclusive set of processors. The kernel applies each separate task of the ST workload to a separate local run queue of each selected one hardware thread per processor within the exclusive set of processors. The kernel sends an interrupt to wake up the selected one hardware thread per processor.

For an exclusive set of processors, the kernel instructs the processors to only search for tasks from local run queues and not to search global run queues for more tasks. The kernel then drains all non-bound tasks from the local run queues of the exclusive set of processors to the global run queue and all bound-work is completed and each hardware thread in the exclusive set of processors is placed in an idling mode. The kernel places the tasks of the ST workload across the local run queues of the selected one hardware thread per processor in the exclusive set of processors and blocks placement of tasks on the remaining hardware threads of the exclusive set of processors.

In one embodiment, the hypervisor, upon receiving a ceded hardware thread, sets the hardware thread to a snooze more, where in snooze mode the hardware thread does not use processor resources and only wakes up and is returned to the idle process responsive to particular interrupts. When the kernel schedules a task on one of the hardware threads of an exclusive processor, the kernel triggers an interrupt to wake up the selected one hardware thread per processor. Then, the idle process detects the scheduled task for the hardware thread and triggers the dispatcher for the hardware thread to perform the task. The remaining hardware thread per processor continues to remain in snooze mode, within minimal use of processor resources, such as when periodically awoken by a timer interrupt and passed to the idle process which detects that the remaining hardware thread per process is still without a task to perform.

In another embodiment, the hypervisor detects when all the hardware threads for a particular processor are idle and automatically returns the idle hardware threads to the idle process, instead of placing each hardware thread in snooze mode. By immediately returning the hardware threads in an exclusive set to the idle process, the idle process is constantly checking for a task to be placed on the local run queues of the hardware threads of the exclusive set of processors and quickly begins execution of ST workload tasks once scheduled. Once the hypervisor detects one hardware thread ceded from the idle process, but the other hardware thread for the processor no longer set to idle because the ST tasks are being processed, the hypervisor places the remaining hardware threads in snooze mode and limits the types of interrupts that trigger waking up the remaining hardware threads of an exclusive set of processors.

Concurrent with managing execution an ST workload on the SMT enabled processing system, the kernel handles management of SMT workloads on the SMT enabled processing system on processors not included in an exclusive set. In addition, when a ST workload is completed, the processors included in the exclusive processor set are freed for use by the kernel in handling management of SMT workloads.

In another embodiment of the invention, a SMT enabled processor system, includes multiple processors each enabled for simultaneous execution of multiple hardware threads and a memory for storing a kernel for controlling application of workloads to the multiple processors. The kernel of the SMT enabled processor system is operative to facilitate construction of an exclusive set of processors to handle the tasks of the ST workload, wherein the ST workload runs more efficiently on single threaded processors. In addition, the kernel is operative to set a separate dispatcher for each hardware thread of the exclusive set of processors to only execute work on each local run queue associated with each hardware thread of the exclusive set of processors. The kernel is operative to drain any tasks waiting one each local run queue associated with each hardware thread of the exclusive set of processors. Responsive to each hardware thread being placed in an idle mode without any tasks to perform, the kernel is operative to set each hardware thread of the exclusive set of processors in a snooze mode, wherein only an interrupt awakens each hardware thread placed in snooze mode to search an associated local run queue for waiting tasks. The kernel is operative to schedule the ST workload on the exclusive set of processors by selecting one hardware thread per processor within said exclusive set of processors to handle a separate one of the tasks of the ST workload, while requiring the remaining hardware threads per processor within the exclusive set to idle. The kernel is operative to apply each separate task of the ST workload to a separate local run queue of each selected one hardware thread per processor within the exclusive set of processors. The kernel is operative to send an interrupt to wake up the selected one hardware thread per processor.

In another embodiment of the invention, a computer program product manages a SMT enabled processor system including multiple processors each activated to simultaneously execute multiple hardware threads. The computer program product includes one or more computer-readable tangible storage devices. The computer program product includes program instructions, stored on at least one of the one or more storage devices to facilitate construction of an exclusive set of processors to handle the tasks of the ST workload, wherein the ST workload runs more efficiently on single threaded processors. The computer program product includes program instructions, stored on at least one of the one or more storage devices to set a separate dispatcher for each hardware thread of the exclusive set of processors to only execute work on each local run queue associated with each hardware thread of the exclusive set of processors. The computer program product includes program instructions stored on at least one of the one or more storage devices to drain any tasks waiting one each local run queue associated with each hardware thread of the exclusive set of processors. The computer program product includes program instructions, stored on at least one of the one or more storage devices, responsive to each hardware thread being placed in an idle mode without any tasks to perform, to set each hardware thread of the exclusive set of processors in a snooze mode, wherein only an interrupt awakens each hardware thread placed in snooze mode to search an associated local run queue for waiting tasks. The computer program product includes program instructions stored on at least one of the one or more storage devices to schedule the ST workload on the exclusive set of processors by selecting one hardware thread per processor within said exclusive set of processors to handle a separate one of the tasks of the ST workload, while requiring the remaining hardware threads per processor within the exclusive set to idle. The computer program product includes program instructions, stored on at least one of the one or more storage devices to apply each separate task of the ST workload to a separate local run queue of each selected one hardware thread per processor within the exclusive set of processors. The computer program product includes program instructions, stored on at least one of the one or more storage devices to send an interrupt to wake up the selected one hardware thread per processor.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a high level logic flowchart depicting a process and program for running a ST workload in a SMT enabled system;

FIG. 6 is a high level logic flowchart illustrating a process and program for simulating an ST mode using a hypervisor function to control idling hardware threads in an SMT enabled system;

DETAILED DESCRIPTION OF THE PREFERRED EMBODIMENT

Figure 1:
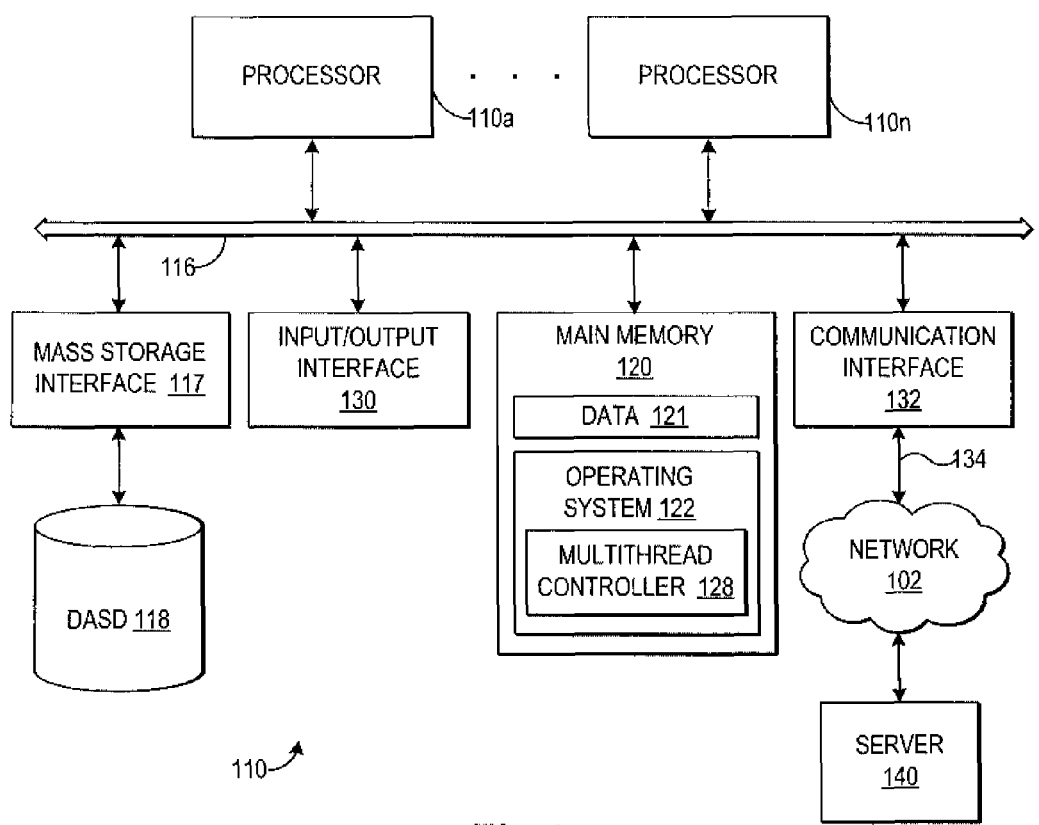
FIG. 1 is a block diagram depicting there is one embodiment of a multi-processor computer system in which the present invention may be implemented.

Referring now to the drawings and in particular to FIG. 1, there is depicted one embodiment of a multi-processor computer system in which the present invention may be implemented. It will be understood that while FIG. 1 depicts one embodiment of a system, the present invention may be executed in a variety of systems, including a variety of computing systems and electronic devices. In addition, it will be understood that FIG. 1 does not imply structural limitations, but is merely illustrative of the types of components that may be included in a multiprocessor computing system.

As depicted, a computer system 100 includes a bus 116 or other communication device for communicating information within computer system 100. Bus 116 preferably includes low-latency and high latency paths that are connected by bridges and adapters and controlled within computer system 100 by multiple bus controllers.

Coupled to bus 116 are multiple processors (such as processors 110a-110n), a mass storage device interface 117, an input/output (I/O) interface 130, a main memory 120, and a communication interface 132. It will be understood that alternate and additional components may be connected to bus 116 in computer system 100.

Mass storage interface 117 is used to connect mass storage devices, such as a direct access storage device (DASD) 118 to computer system 100. It will be understood that multiple types of mass storage devices may be connected to computer system 100 and viewed logically as a single logical disk or multiple logical disks of data storage.

Processors 110a-110n may be general purpose processors, such as IBM's PowerPC™ processors that, during normal operation, process data under the control of operating system 122, middleware (not depicted), application software (not depicted), and other code accessible from main memory 120, mass storage devices, or other data storage mediums. In one embodiment, operating system 122 includes a multithread controller 128 and other controllers containing machine executable instructions for managing use of the hardware threads of each of processors 110a-110n, that when executed on processors 110a-110n, carry out the operations depicted in the flowcharts and other operations described herein. Alternatively, the steps of the present invention might be performed by specific hardware components that contain hardwired logic for performing the steps, or by any combination of programmed computer components and custom hardware components.

Main memory 120 preferably stores data 121 and operating system 122. Main memory 120 may include dynamic storage devices, such as random access memory (RAM) and static storage devices such as Read Only Memory (ROM). Data 121 represents any data that serves as input to or output from any program in computer system 100. It will be understood that computer system 100 may implement logical addressing that organizes all the available memory of the system into logical disks instead of individual memory component such as main memory 120 and DASD 118. Therefore, while data 121 and operating system 122 are depicted as residing in main memory 120, those skilled in the art will recognize that these components are not necessarily contained in main memory 120 at the same time. It should also be noted that the term "memory" is used herein to generically refer to the entire logical memory of computer system 100, and may include the logical memory of other computer systems coupled to computer system 100.

In one embodiment, operating system 122 includes multithread controller 128 which adjusts the multithreading characteristics for processors 110a-110n. Multithread controller 128 activates the multiple hardware threads on each of processors 110a-110n when running processors 110a-110n in a SMT mode. In addition, multithread 128 simulates an ST mode on selected processors from among processors 110a-110n and runs a workload designed to run more efficiently on single threaded processors on the selection of processors with a similar performance efficiency as if the selection of processors were reconfigured to an ST mode, but without using the time to actually reconfigure each processor to operate in an ST mode.

I/O interface 130 is used to connect input and output interfaces to computer system 100. Examples of input interfaces include, but are not limited to a keyboard, a mouse, a touch screen, and a microphone. Examples of output interfaces include, but are not limited to displays, speakers, and printers. The interfaces, such as a display, connected to computer system 100 via I/O interface 130 may be used to allow system administrators and users to communicate with computer system 100. It is important to note that while I/O interface 130 provides one way to communicate with computer system 100, a user may also communicate with computer system 100 via communication interface 132, as will be further described.

It is important to note that the present invention may also be provided as a computer program product, included on a machine-readable medium having stored thereon the machine executable instructions used to program computer system 100 to perform a process according to the present invention. The term "machine-readable medium" as used herein refers to any data storage medium that participates in providing instructions to processors 110a-110n or other components of computer system 100 for execution. Such a data storage medium may take many forms including, but not limited to, non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM.

Moreover, the present invention may be downloaded as a computer program product, wherein the program instructions may be transferred to operating system 122 from a remote computer such as a server 140 to requesting computer system 100 by way of data signals embodied in a carrier wave or other propagation medium via a network link 134 (e.g. a modem or network connection) to a communications interface 132 coupled to bus 116. Communications interface 132 provides a two-way data communications coupling to network link 134 that may be connected, for example, to a local area network (LAN), wide area network (WAN) or directly to an Internet Service Provider (ISP). In particular, network link 134 may provide wired and/or wireless network communications to one or more networks, such as a network 102. Network 102 may refer to the worldwide collection of networks and gateways that use protocols, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. Further, although not depicted, communication interface 132 may include software, such as device drivers, hardware, such as adapters, and other controllers that enable communication.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
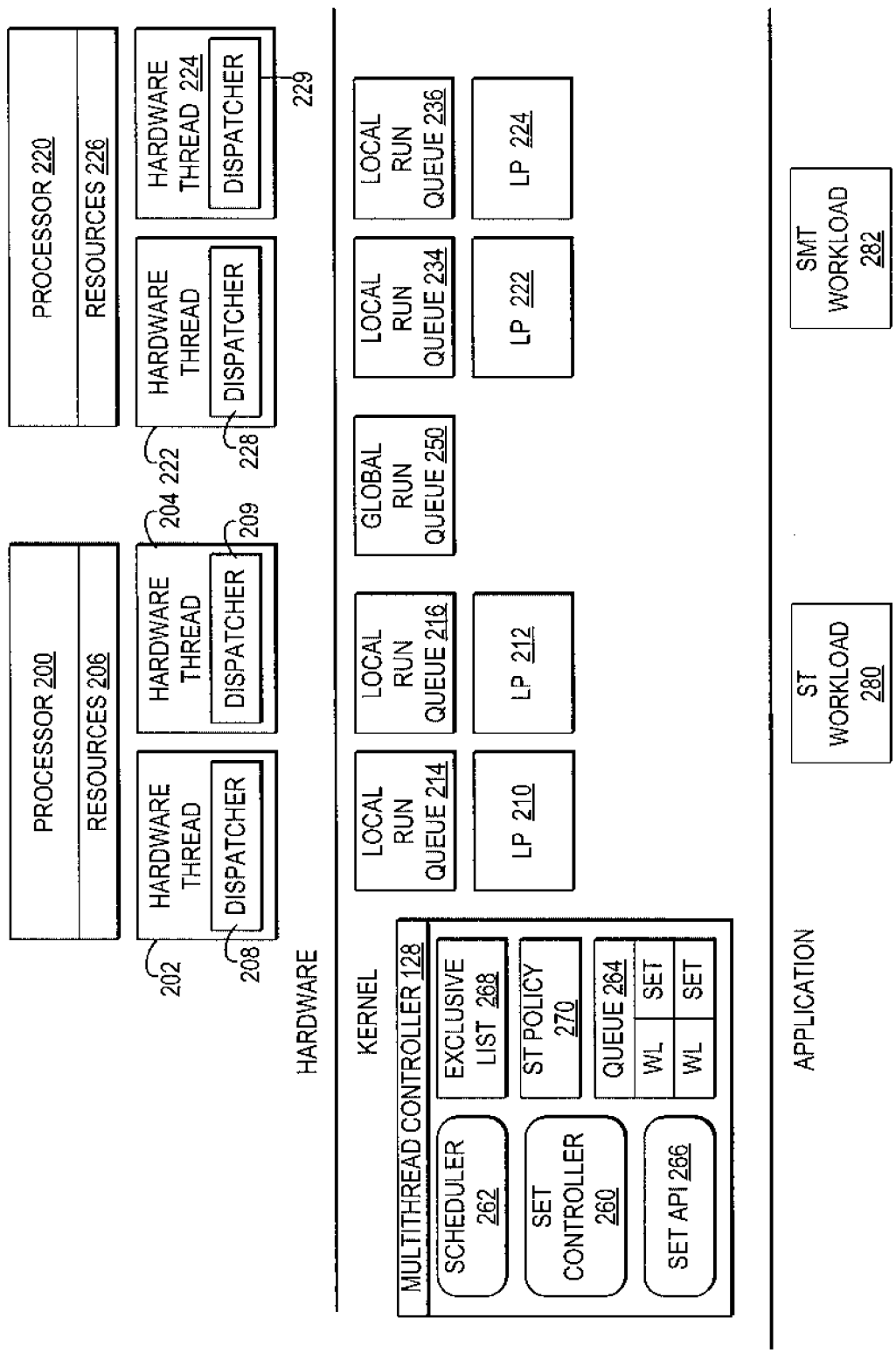
FIG. 2 is a block diagram illustrating an example of a SMT enabled processing system for running both SMT and ST workloads, where the ST workload runs on processors simu

With reference now to FIG. 2, there is depicted a block diagram illustrating an example of a SMT enabled processing system for running both SMT and ST workloads, where the ST workload runs on processors simulating an ST mode without switching to ST mode, but with comparable performance as if the workload were running on processors switched to ST mode. In a SMT enabled processing system, from a hardware perspective, each processor, such as processors 200 and 220, supports multiple hardware threads, such as hardware threads 202 and 204 of processor 200 and hardware threads 222 and 224 of processor 220. In one example, each hardware thread represents a separate execution unit or central processing unit (CPU) within a processor, where each execution unit within a processor shares resources of the processor, such as resources 206 and 226, where the shares resources may include, but are not limited to cache, translation look-ahead buffers (TLBs), registers, and controllers.

From a kernel perspective, to enable SMT mode on processors 200 and 220, the hardware threads of each processor, such as hardware threads 202 and 204 of processor 200 and hardware threads 222 and 224 of processor 220, must be activated. The kernel views an activated hardware thread as a logical processor, represented in the figure as logical processors 210 and 212 representing hardware threads 202 and 204 and logical processors 230 and 232 representing hardware threads 222 and 224. For example, multithread controller 128 activates each of hardware threads 202, 204, 222, and 224 and configures the operating system to process workloads on logical processors 210, 212, 230, and 232.

During normal operation, a dispatcher for each hardware thread, such as dispatchers 208 and 209 of hardware threads 202 and 204 and dispatchers 228 and 229 of hardware threads 222 and 224, reads the hardware thread's local run queue to access a next task to process. For example, local run queues and 214 and 216 are respectively associated with hardware threads 202 and 204 and local run queues 234 and 236 are respectively associated with hardware threads 222 and 224. If the local run queue is empty, then the dispatcher may search a global run queue 250 for a next job. If no jobs are available in the global run queue or if a flag is set for the dispatcher to only search the local run queue and the local run queue is empty, then the processor thread calls an idle process. In one embodiment, as will be further described, the idle process may cede an idle processor to a hypervisor application programming interface, where the hypervisor provides additional control over idle hardware threads. In one example, during normal operation, the hypervisor sets an idle hardware thread to snooze. A hardware thread set to snooze does not use processor resources and the dispatcher does not use processor cycles, but the hardware thread can be woken up by an interrupt. It will be understood that additional or alternate application programming interfaces or processes may control an idle hardware thread.

In addition, during normal operation, set controller 260 may designate a selection of processors or logical processors from among the total processors in a set of processors to handle the tasks of the workload. Each set of processors is associated with a respective workload in queue 264. As scheduler 262 creates the tasks for each workload in queue 264, scheduler 262 applies each task of the workload to the local run queues of the selected logical processors. For example, a set of logical processor could include logical processors 212, 222, and 224, where scheduler 242 applies tasks of the workload to each of local run queues 216, 234 and 236. In another example, a set may be designated as global run queue 250, wherein scheduler 242 may distribute the tasks of the workload to a global run queue 250 and the tasks are then load balanced and distributed from global run queue 250 to local run queues available to receive the tasks. It will be understood that the kernel may implement multiple types of scheduling policies and options.

When the kernel detects an ST workload, such as ST workload 280, passed from the application layer in the SMT enabled processing system, multithread controller 128 controls the selection of an exclusive set of processors and directs scheduling of ST workload 280 on the exclusive set of processors by scheduler 242 according to a policy 270 that requires selecting only one logical processor for each processor to receive each task of a ST workload.

First, in controlling a selection of an exclusive set of processors, set controller 260 enables declaring a selection of processors as exclusive. In one example, when a processor is declared in an exclusive set, both hardware threads, and thus both logical processors of the processor, are automatically declared exclusive in an exclusive list 268. In another example, each hardware thread of a processor may be separately declared as exclusive, however to simulate an ST mode for running a ST workload both hardware threads of the processor must be declared as exclusive.

When a hardware thread is declared exclusive, multithread controller 128 automatically drains any non-bound, waiting tasks from the hardware thread's local run queue to global run queue 250. Next, when a hardware thread is declared exclusive, the dispatcher for the hardware thread is set, through a bit selection or process, to only search for and access new tasks for the hardware thread's local run queue. For example, if hardware threads 202 and 204 are declared exclusive, then dispatchers 208 and 209 would only look to local run queues 214 and 216 respectively for new tasks. Since all tasks are drained from local run queues 214 and 216, dispatchers 208 and 209 detect hardware threads 202 and 204 are idle and an idle process may cede each idle hardware thread to the hypervisor.

Second, in controlling scheduling of ST workload 280 on the exclusive set of processors, scheduler 242 detects that the processor set associated with a workload in queue 264 is declared exclusive and implements ST policy 270 in distributing the tasks of the workload to the processors in the set. In one example, ST policy 270 requires scheduler 242 to dynamically create, from the exclusive set of processors, a set of one logical processor per processor represented, and to place the tasks for the workload on the local run queues of new set of logical processors.

Once scheduler 242 selects the logical processors according to ST policy 270, scheduler 242 places the tasks of ST workload 280 on the local run queues of the selected logical processors. Next, scheduler 242 triggers an interrupt to wake up the hardware threads for the selected logical processors, if the selected logical processors are still ceded to the hypervisor. As one hardware thread per processor is woken up, the dispatcher for each processor is still set to only select tasks from the local run queue for the hardware thread. For example if an exclusive set includes processor 200, then scheduler 242 selects only one of logical processors 210 and 212, such as logical processor 210. Scheduler 242 places a task on local run queue 214 and sends an interrupt to wake up hardware thread 202, if necessary. Dispatcher 208 detects that hardware thread 202 is woken up and accesses tasks only from local run queue 214. No work is placed on local run queue 216 and hardware thread 204 continues to snooze, while processor 200 is marked exclusive and hardware thread 202 processes the task of the ST workload.

Thus, when processor 200 or any other processor is marked as exclusive, multithread controller 128 controls operation of that processor in a simulated ST mode without requiring deactivation of a hardware thread at the hardware layer and dynamic reconfiguration of the logical processors at the kernel and application layers. Further, advantageously, multithread controller 128 controls operation of processors marked as exclusive in the simulated ST mode at a performance level that is comparable to the performance achieved by running an ST workload in ST mode, where in ST mode all but one hardware thread activated on each processor.

It will be understood that when a processor is not marked as exclusive, multithread controller 128 controls normal operation of that processor in SMT mode. For example, if processor 200 is included in an exclusive set assigned to ST workload 280, ST workload 280 runs on one hardware thread of processor 200, with the other hardware thread maintained in an idling state; concurrently, an SMT workload 282 passed from the application layer is scheduled by scheduler 262 and runs on both hardware threads of processor 220.

From the application perspective, a user or application may specify a workload as an ST workload and specify the exclusive set of processors through a set application programming interface (API) 266. In one example, a user defines an exclusive set of processor through set API 266 by designating the number of processors required for processing an ST workload and directs set API 266 to run a particular workload as an ST workload on the exclusive set. The workload is added to queue 264 as an ST workload. Set controller 260 receives the set specification for the workload from API 266 and searches for and selects a set of processors of the number requested that are available to be included in the exclusive set. In another example, an application requests, through set API 266 for a listing of processors available to be included in an exclusive set. API 266 returns a listing of processors available to be included in the exclusive set. The application then defines a specific range of the available processors in the exclusive set and directs API 266 to run a particular workload as an ST workload on the specific processors defined in the exclusive set. In another example, API 266 may run the workload to detect the number of threads included in the workload and define an exclusive set of processors for running the workload equal to the detected number of threads.

In the embodiment, when a processor is included in an exclusive set, the processor is included in exclusive list 268. When a processor is included in exclusive list 268, set controller 260 may block any other workloads from binding work to any of the logical processors of the processor. For example, set API 266 may reject a set creation request from an application that includes a specific binding to a particular logical processor of a processor marked as exclusive in exclusive list 268. In addition, set API 266 will not include processors included in exclusive list 268 as processors available for a new set. It will be understood that exclusive list 268 may also implement a queue or other management tool to facilitate dynamic scheduling of processors as exclusive or non-exclusive.

It is important to note that while the present invention is described with reference to simulating an ST mode, the kernel may also controlling switching a processor to ST mode and running a ST workload on processors running in ST mode. In addition, it is important to note that while the present invention is described with reference to each processor running in a SMT mode, the kernel may also run selections of processors in ST mode. Further, while the present invention is described with reference to SMT enabled processors, selections of processors managed by the kernel may only provide a single threaded option.

Figure 3:
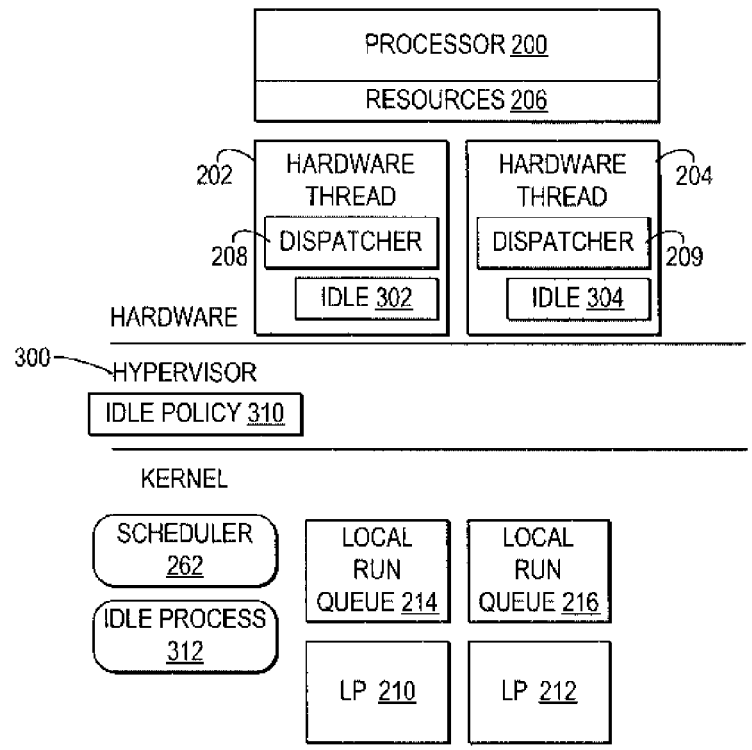
- FIG. 3 is a block diagram depicting one example of a SMT enabled processing system with a software layer for facilitating hardware thread snooze.

Referring now to FIG. 3, a block diagram depicts one example of a SMT enabled processing system with a software layer for facilitating hardware thread snooze. In the example, when a dispatcher for a hardware thread, such as dispatcher 208 for hardware thread 202, detects a local run queue is empty and dispatcher 208 is set to only search local run queue 214 for tasks, dispatcher 208 calls an idle process, such as idle process 312. In the embodiment depicted, idle process 312 is a function controlled by the kernel, however, in alternate embodiments, each processor or hardware thread may include a separate idle process or the idle process may run separate from the kernel in another application layer.

Idle process 312 searches the local run queue for a hardware thread for waiting jobs, and, if there is no job waiting, sets the idle bit for the hardware thread and cedes the hardware thread to hypervisor 300. For example, idle process 312 sets idle bit 302 for hardware thread 202 and idle bit 304 for hardware thread 204. While in the embodiment idle bits 302 and 304 are illustrated in the hardware layer, it will be understood that in alternate embodiments, idle bits may be set in alternate layers, such as the kernel layer.

In one example, when an idle bit for a hardware thread is set, hypervisor 300 maintains the hardware thread in a snooze mode. When in snooze mode, hypervisor 300 blocks the hardware thread from using dispatch cycles or controlling any processor shared resources and only awakens the hardware thread when an interrupt is received. Thus, when a hardware thread is set in snooze mode, hypervisor 300 waits for an interrupt from the kernel or a timer interrupt and when an interrupt is detected, hypervisor 300 returns a hardware thread to idle process 312. Idle process 312 checks for tasks in the local run queue of the awakened hardware thread and if tasks are waiting in the local run queue, the idle process resets the idle bit for the awakened hardware thread and triggers the dispatcher to run the task on the awakened hardware thread. If idle process 312 does not detect a waiting task, then the idle bit for the awakened hardware thread remains set and the hardware thread is ceded again to hypervisor 300.

Thus, in the example, in one embodiment where hypervisor 300 maintains idle hardware threads in snooze mode, when scheduler 262 places a task on one of hardware threads 202 and 204 and processor 200 is marked as exclusive, scheduler 262 sends an interrupt to hypervisor 300 to trigger hypervisor 300 to return control of the selected hardware thread to idle process 312. For example, scheduler 262 may place the task on local hardware queue 214 and send an interrupt to hypervisor 300 to awaken hardware thread 202 and return control of the hardware thread to idle process 312. Idle process 312 detects the task on local hardware queue 214 and calls dispatcher 208 to handle the task. Hardware thread 204 remains in snooze mode as controlled by hypervisor 300 and set controller 260 prevents other applications from binding a task to either of hardware threads 202 and 204 while processor 200 is marked as exclusive, such that hardware thread 202 runs in simulated ST mode.

According to an advantage, in one embodiment, to more efficiently manage hardware threads in a simulated ST mode, hypervisor 300 may provide additional functions according to idle policy 310. In particular, to more efficiently implement a simulated ST mode, idle policy 310 may include instructions for controlling hardware threads when both hardware threads are idle and then when one hardware thread is active and one remains idle.

First, idle policy 310 may direct hypervisor 300 when all hardware threads for a processor are set as idle, to return a hardware thread to idle process 312 as soon as hypervisor 300 receives the ceded hardware thread. By immediately returning a hardware thread from hypervisor 300 to idle process 312 when both hardware threads for a processor remain idle, when processor 200 is marked as exclusive and scheduler 262 places a task on the local run queue of one of hardware threads 202 and 204, such as local run queue 214 of hardware thread 202, it is more likely that the idle process 312 will already have receive hardware thread 202 from hypervisor 300, will be searching local run queue 214 for new jobs, and thus idle process 312 will more efficiently call dispatcher 208 to run the task. In addition, if scheduler 262 detects that hardware thread 202 is still ceded to hypervisor 300 when placing the task on local run queue 214, scheduler 262 may send an interrupt to hypervisor 300 to immediately awaken hardware thread 202. In one example, idle process 312 may set a bit when it cedes a hardware thread to hypervisor 300 and unset the bit when the hardware thread is returned from hypervisor 300, so that scheduler 262 may efficiently detect whether a hardware thread is currently ceded to hypervisor 300.

Second, idle policy 310 may direct hypervisor 300, once one hardware thread is no longer set to idle and the other hardware thread is idle, to place the remaining idle hardware thread in snooze mode that is only interruptible by timer interrupts and a specified kernel interrupt. By limiting the types of interrupts that wake up a snoozing hardware thread when a processor is marked exclusive, the idle thread is awoken fewer times, triggering the idle process fewer times, and using fewer processor resources. In particular, in one example, when processor 200 is declared exclusive and scheduler 262 places a task on local run queue 214, when idle process 312 receives hardware thread 202 from hypervisor 300, idle process 312 detects the waiting task, unset idle bit 302, and calls dispatcher 208 to handle the task. In the example, however, idle process 312 will continue to detect no task waiting in local run queue 216 and cede control of hardware thread 204 to hypervisor 300. According to idle policy 310, when hypervisor 300 detects idle bits 302 and 304 both set and then receives control of hardware thread 204 with idle bit 302 no longer set, hypervisor 300 places hardware thread 204 in snooze mode with limited triggers for interrupts. In one example, idle policy 310 allows a timer interrupt, such as a timer interrupt each 10 milliseconds, which triggers hypervisor 300 to return hardware thread 204 to idle process 312 every 10 ms.

It is important to note that using hypervisor 300 to control idle hardware threads in the process of simulating an ST mode is one way for multithread controller 128 to simulate an ST mode in a processor. It will be understood that other SMT enabled processing systems may implement other types of functions among the layers of the system for placing a hardware thread in a state where it does not use processor resources or dispatch cycles until a particular type of interrupt is detected. In addition, it will be understood that other types of idle policies may be implemented to minimize the amount of time it takes for an exclusive hardware thread to detect a waiting task and once an exclusive hardware thread is processing a task, to minimize the number of times the remaining hardware thread searches for waiting tasks.

Figure 4:
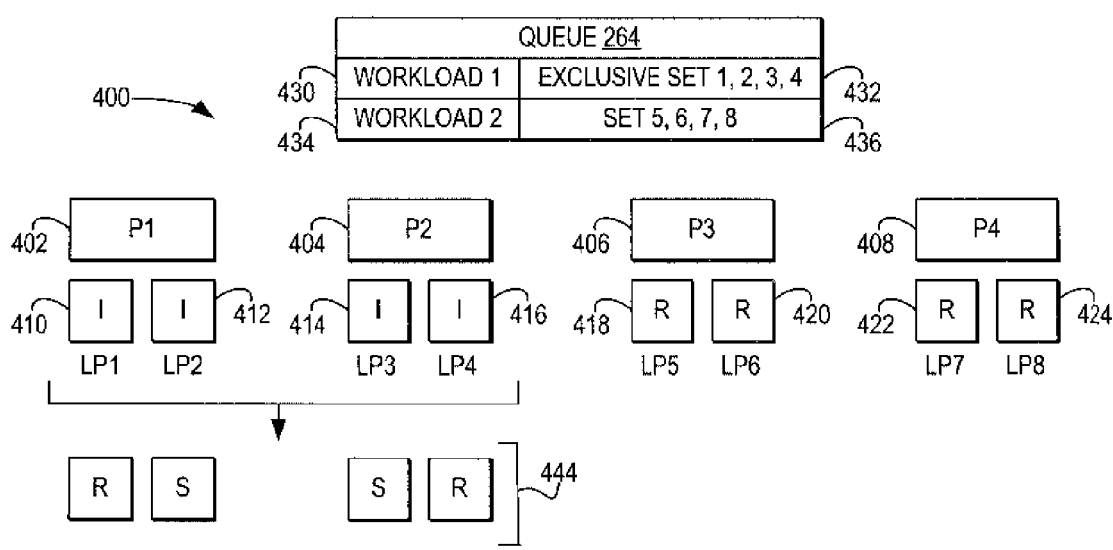
FIG. 4 is an illustrative diagram illustrating a SMT enabled system running mixed workloads.

With reference now to FIG. 4, an illustrative diagram depicts a SMT enabled system running mixed workloads. As illustrated, a SMT enabled system 400 includes processor 402 with active hardware threads 410 and 412, processor 404 with active hardware threads 414 and 416, processor 406 with active hardware threads 418 and 420, and processor 408 with active hardware threads 422 and 424.

Queue 264 includes a ST workload 430 set to run on exclusive set 432 and a SMT workload 434 set to run on non-exclusive set 436. In the example, exclusive set 432 includes logical processors LP1, LP2, LP3, and LP4 corresponding with hardware threads 410, 412, 414, and 416. Non-exclusive set 436 includes logical processors LP5, LP6, LP7, and LP8 correspondence with hardware threads 418, 420, 422, and 424.

In the example, scheduler 262 distributes the tasks of SMT workload 434 across LP5, LP6, LP7, and LP8 to run on hardware threads 418, 420, 422 and 424 by placing the tasks on the local run queues of each of hardware threads 418, 420, 422, and 424. In the example, an "R" indicates a hardware thread running tasks from local and global run queues. In particular, although not depicted, particular tasks of SMT workload 434 may be bound to particular logical processors or scheduler 262 may load balance the tasks across the selected logical processors.

In addition, in the example, set controller 128 detects exclusive set 432 and drains any tasks off the local run queues for hardware threads 410, 412, 414, and 416. In turn, each of hardware threads 410, 412, 414, and 416 are set to idle, as illustrated by the "I" and ceded to the hypervisor. In one example, the hypervisor maintains each of the hardware threads in a snooze mode, interruptible by the kernel and timer interrupts. In another example, since both hardware threads of each exclusive processor are idle, the hypervisor may immediately return the hardware threads to the idle process until one hardware thread for each exclusive processor is no longer idle.

Next, scheduler 262 applies ST policy 270 to exclusive set 432 and selects LP1 and LP4 to receive the tasks of ST workload 430. Scheduler 262 places the tasks of ST workload 430 on the local run queues of hardware threads 410 and 416 and triggers hardware threads 410 and 416 to return from the hypervisor. As illustrated at reference numeral 444, hardware threads 410 and 416 return from the hypervisor and process the tasks on their local run queues, as indicated by the "R". Hardware threads 412 and 414 are placed in or continue in snooze mode, as illustrated by the "S", until ST workload 430 is complete and scheduler 262 triggers hardware threads 412 and 414 to wake up. In particular, once ST workload 430 is complete, scheduler 262 removes processors 402 and 404 from exclusive list 268 so that processors 402 and 404 are available for receiving SMT workload tasks or for inclusion in another exclusive set for another ST workload.

As illustrated, SMT enabled system 400 runs mixed workloads, of ST and SMT workloads, concurrently, by setting aside a selection of the processors for running an ST workload as exclusive and controlling only one thread for each exclusive processor to run and access tasks from a local run queue. It will be understood that although the example is described with reference to all the processors in SMT enabled system 400 with all hardware threads activated to enable SMT on each processor, in other examples, a SMT enabled system may include selections of processors that are not SMT enabled, but only run a single thread and exclusive sets may include the single hardware thread of the ST processor.

Referring now to FIG. 5, a high level logic flowchart depicts a process and program for running a ST workload in a SMT enabled system. As illustrated the process starts at block 500 and thereafter proceeds to block 502. Block 502 depicts a determination whether a kernel receives a ST workload. An ST workload may be indicated by a bit set in the workload request, a designated processor set for the workload marked as exclusive, or other indication that the workload should run in a simulated ST mode on the SMT enabled system. In addition, a user or application may interface with the kernel and send ST workload requests via a set API. When an ST workload is detected, the process passes to block 504.

Block 504 depicts setting the number of processors required to process each of the tasks of the ST workload as exclusive, where the local run queues for the exclusive processors are cleared and the hardware threads of an exclusive processor are set to idle. In one example, the processor set assigned to the ST workload indicates the number of processors required and in another example, the process set assigned to ST workload specifies particular processors to set as exclusive.

Next, block 506 illustrates selecting a new set of one logical processor of each exclusive processor according to ST policy. Thereafter, block 508 depicts applying the ST workload tasks to the local run queues of the selected logical processors and triggering the selected logical processors to run the ST workload tasks. Thereafter, block 510 illustrates blocking placement of any tasks on the local run queues of non-selected logical processors of the exclusive processors. Next, block 512 depicts a determination whether the ST workload is completed. If the ST workload is completed, the process passes to block 514. Block 514 illustrates removing the exclusive setting from the selected processors, and the process ends.

With reference now to FIG. 6, a high level logic flowchart illustrates a process and program for simulating an ST mode using a hypervisor function to control idling hardware threads in an SMT enabled system. As illustrated, the process starts at block 600 and thereafter proceeds to block 602. Block 602 depicts a determination whether a kernel detects an exclusive processor set. If the kernel detects an exclusive processor set, then the process passes to block 604. Block 604 illustrates setting the dispatcher of each hardware thread in the exclusive set to only access local run queues. Next, block 606 depicts draining the local run queues of the hardware threads in the exclusive processor set. Thereafter, block 608 illustrates selecting one logical processor per processor in the exclusive set. Next, block 610 depicts applying the tasks to the local run queues of the selected processors. Thereafter, block 612 illustrates sending an interrupt to the hypervisor to wake up the selected thread per exclusive processor if selected thread is not currently returned from the hypervisor to the idle process. Next, block 614 depicts a determination whether the ST workload is completed. If the ST workload is completed, the process passes to block 616. Block 616 depicts unflagging the dispatchers of the exclusive hardware threads to only read from a local run queue. Next, block 618 illustrates sending an interrupt to the hypervisor to wake up the non-selected threads per exclusive processor.

Figures 7, 8:
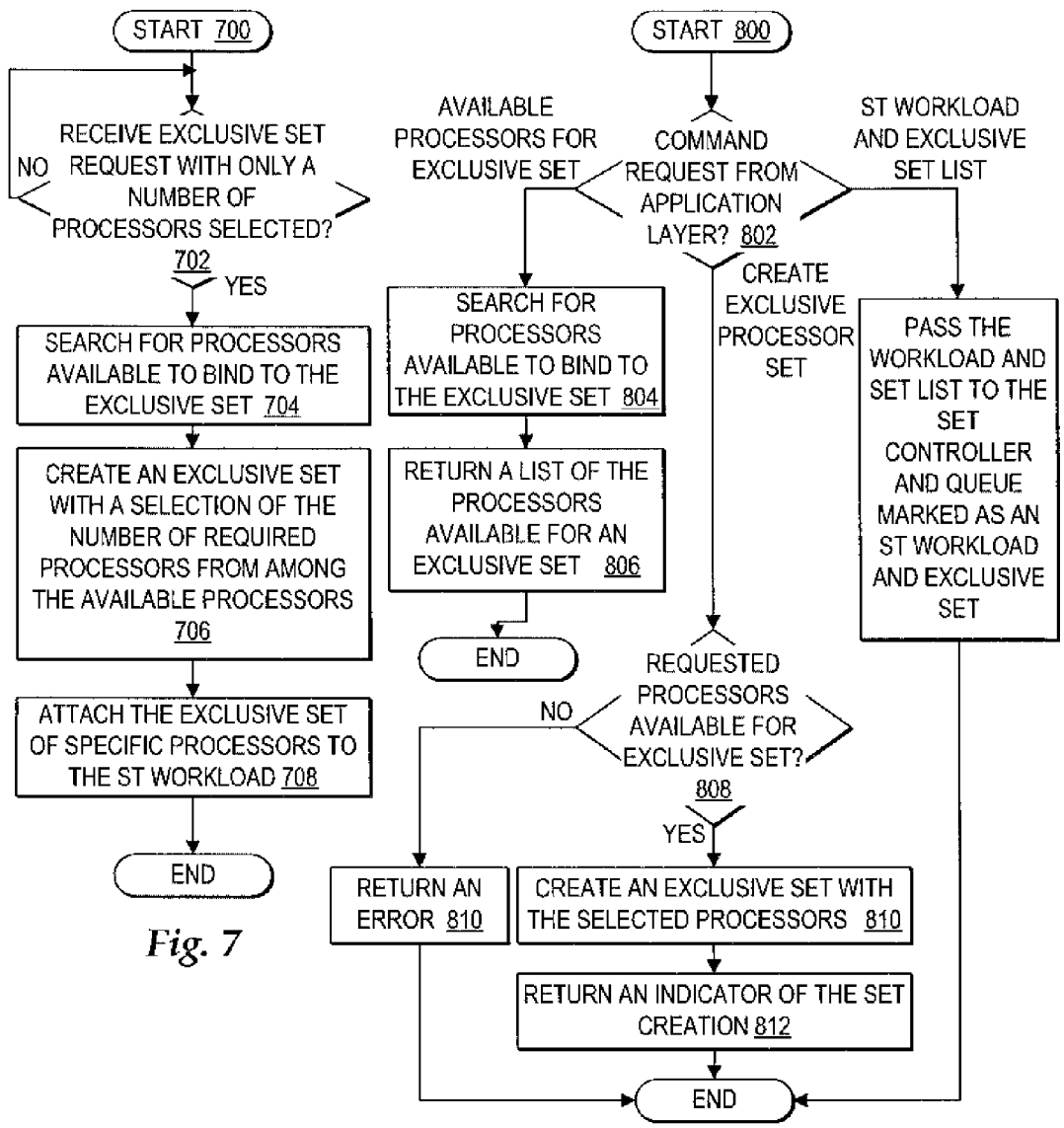
FIG. 7 is a high level logic flowchart depicting a process and program for a set controller automatically creating a set of exclusive processors for an ST workload.
FIG. 8 is a high level logic flowchart illustrating a process and program for a set API interfacing with an application layer to facilitate creating a processor set for an ST workload.

Referring now to FIG. 7, a high level logic flowchart depicts a process and program for a set controller automatically creating a set of exclusive processors for an ST workload. As illustrated, the process starts at block 700 and thereafter passes to block 702. Block 702 illustrates a determination whether the kernel receives an ST workload with a processor set defined by the number of exclusive processors required. If the ST workload with a processor set number is received, then the process passes to block 704. Block 704 depicts searching for available processors to specify in the exclusive set. In searching for available processors, the set controller may redistribute bound jobs from one processor to another to free up a sufficient number of processors to run only the ST workload tasks. Next, block 706 illustrates creating an exclusive set of processors of the number of required processors. Thereafter, block 708 depicts attaching the exclusive set to the workload, and the process ends.

With reference now to FIG. 8, a high level logic flowchart illustrates a process and program for a set API interfacing with an application layer to facilitate creating a processor set for an ST workload. As illustrated, the process starts at block 800 and thereafter proceeds to block 802. Block 802 depicts a determination of what command request is received. If the command request is for the available processors for an exclusive set, then the processor passes to block 804. Block 804 illustrates triggering the set controller to search for the available processors to include in an exclusive set. Next, block 806 depicts returning the list of available processors to include in an exclusive set to the requesting application, and the process ends.

Returning to block 802, if the command request is to create an exclusive processor set with a selection of the listed processors, then the process passes to block 808. Block 808 illustrates checking whether the processors are available for the exclusive set. If the processors are not available, then the process passes to block 810, which depicts sending an error message to the application, and the process ends. If the processors are available, then the process passes to block 812. Block 812 depicts returning an indicator that the set is created, and the process ends.

Returning to block 802, if the command request is to process a workload as an ST workload with an exclusive processor set, then the process passes to block 814. Block 814 depicts the set API passing the workload request with attached processor set to the set controller and the scheduler queue with directions to process the workload as an ST workload with an exclusive processor set, and the process ends.

While the invention has been particularly shown and described with reference to a preferred embodiment, it will be understood by those skilled in the art that various changes in form and detail may be made therein without departing from the spirit and scope of the invention.

Figure 9:
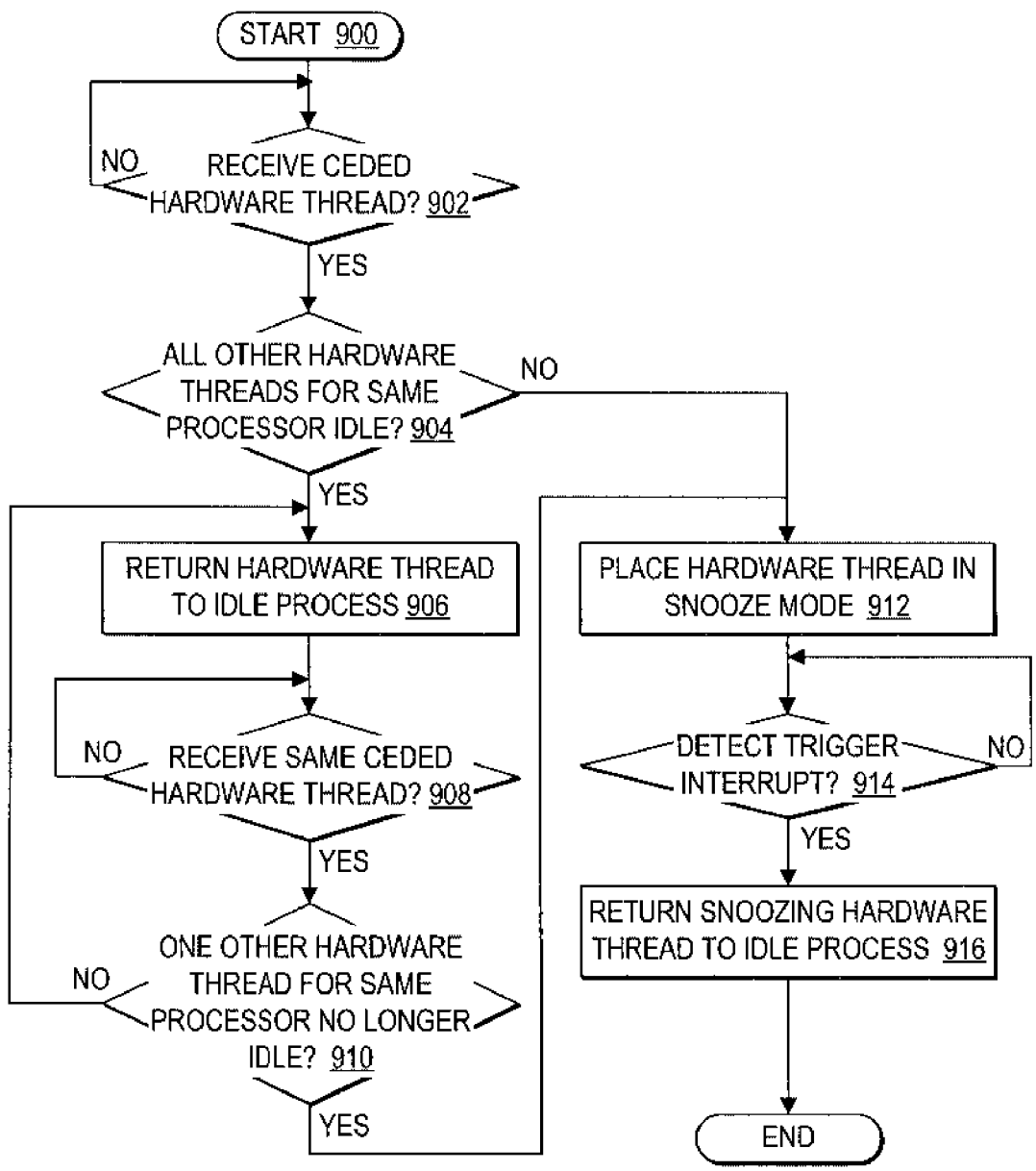
FIG. 9 is a high level logic flowchart depicting a process and program for a hypervisor to control idling hardware threads to facilitate efficient simulation of an ST mode.

Referring now to FIG. 9, a high level logic flowchart depicts a process and program for a hypervisor to control idling hardware threads to facilitate efficient simulation of an ST mode. In the example, the process starts at block 900 and thereafter passes to block 902. Block 902 depicts a determination whether the hypervisor receives a ceded hardware thread from the idle process. If the hypervisor receives a ceded hardware thread from the idle process, then the process passes to block 904. Block 904 depicts a determination whether all other hardware threads for the same process are idle. If all other processor threads for the same processor are not idle, then the process passes to block 912. Block 912 depicts placing the hardware thread in snooze mode. Next, block 914 depicts a determination whether the hypervisor detects a triggerable interrupt for the hardware thread. If the hypervisor detects a triggerable interrupt for the hardware thread, then the process passes to block 916. Block 916 depicts returning the snoozing hardware thread to the idle process, and the process ends.

Returning to block 904, if the hypervisor detects that all other hardware threads for the same process are idle, then the process passes to block 906. Block 906 depicts returning the hardware thread immediately to the idle process. Next block 908 illustrates a determination whether the hypervisor detects the same hardware thread, ceded again to the hypervisor. If the hypervisor detects the same hardware thread ceded to the hypervisor, then the process passes to block 910. Block 910 depicts a determination whether one other hardware thread for the same process is no longer idle. If one hardware thread for the same processor is no longer idle, then the process passes to block 912 and continues as previously described. If both hardware threads for the same processor are still idle, then the process returns to block 906.

While the invention has been particularly shown and described with reference to a preferred embodiment, it will be understood by those skilled in the art that various changes in form and detail may be made therein without departing from the spirit and scope of the invention

What is claimed is:

1. A method for managing a simultaneous multi-threaded (SMT) enabled processor system comprising a plurality of processors each activated to simultaneously execute a plurality of hardware threads, said method comprising:

facilitating construction of an exclusive set of processors from among said plurality of processors to handle a plurality of tasks of an single-threaded (ST) workload in said SMT enabled processing system;

setting a separate dispatcher for each hardware thread of said exclusive set of processors to only execute work on each local run queue associated with each said hardware thread of said exclusive set of processors;

draining any waiting tasks from each local run queue associated with each said hardware thread of said exclusive set of processors;

responsive to placing each said hardware thread of said exclusive set of processors in an idle mode without any tasks to perform, setting each said hardware thread of said exclusive set of processors in a snooze mode, wherein only an interrupt awakens each said hardware thread placed in snooze mode to search an associated local run queue for waiting tasks;

scheduling said ST workload on said exclusive set of processors by selecting only one hardware thread per processor within said exclusive set of processors to handle a separate one of said plurality of tasks of the ST workload while requiring the remaining hardware threads per processor within said exclusive set of processors to remain in said snooze mode, such that said ST workload is executed on an SMT enabled processor system as if said exclusive set of processors are running in ST mode without removing the remaining hardware threads per processor remaining in said snooze mode within said exclusive set of processors;

applying each separate task of said ST workload to a separate local run queue of each said selected one hardware thread per processor within said exclusive set of processors; and sending said interrupt to wake up said selected one hardware thread per processor.

2. The method according to claim 1, further comprising:

passing each said hardware thread of said exclusive set of processors to an idle process, wherein said idle process searches each said local run queue and cedes each said hardware thread of said exclusive set of processors to a hypervisor while each said local run queue associated with each hardware thread of said exclusive set of processors remains empty, wherein said hypervisor automatically returns each said hardware thread to said idle process while each said local run queue associated with each said hardware thread of said exclusive set of processors remains empty;

sending said interrupt to direct said hypervisor to return those selected one hardware thread per processor currently ceded to said hypervisor; and responsive to detecting said remaining hardware threads ceded to said hypervisor, placing each of said remaining hardware threads in said snooze mode, wherein only a particular selection of interrupts awakens each hardware thread placed in snooze mode to return to said idle mode.

3. The method according to claim 1, further comprising:

blocking placement of any other tasks on a remaining selection of local run queues of said remaining hardware threads per processor remaining in said snooze mode within said exclusive set of processors.

4. The method according to claim 1, further comprising:

concurrently, executing a SMT workload on a plurality of activated hardware threads of a remaining selection of non-exclusive processors from among said plurality of processors.

5. The method according to claim 1, wherein scheduling said ST workload further comprises:

detecting a selection of processors from among said plurality of processors available for inclusion in said exclusive set of processors; and enabling said ST workload to request construction of said exclusive set of processors with processors designated from among said selection of processors.

6. The method according to claim 1, wherein facilitating construction of an exclusive set of processors further comprises:

receiving said ST workload with a request for said exclusive set of processors solely defined by said number of said plurality of tasks of said ST workload;

detecting a selection of processors from among said plurality of processors available for inclusion in said exclusive set of processors;

triggering a command to create said exclusive set of processors of a same number as said number of said plurality of tasks with processors designated from among said selection of processors; and attaching said exclusive set of processors to said ST workload.

7. The method according to claim 1, further comprising:

receiving, at a kernel layer of said SMT enabled processing system, said ST workload and a selection of processors from among said plurality of processors marked as exclusive via an application programming interface with an application layer.

8. A simultaneous multi-thread (SMT) enabled processing system, comprising:

a plurality of processors each enabled for simultaneous execution of multiple hardware threads;

a memory for storing a kernel for controlling application of workloads to said plurality of processors;

said kernel operative to facilitate construction of an exclusive set of processors from among said plurality of processors to handle a plurality of tasks of an single-threaded (ST) workload;

said kernel operative to set a separate dispatcher for each hardware thread of said exclusive set of processors to only execute work on each local run queue associated with each said hardware thread of said exclusive set of processors;

said kernel operative to drain any waiting tasks from each local run queue associated with each said hardware thread of said exclusive set of processors;

said kernel, responsive to placing each said hardware thread of said exclusive set of processors in an idle mode without any tasks to perform, operative to set each said hardware thread of said exclusive set of processors in a snooze mode, wherein only an interrupt awakens each said hardware thread placed in snooze mode to search an associated local run queue for waiting tasks;

said kernel operative to schedule said ST workload on said exclusive set of processors by selecting only one hardware thread per processor within said exclusive set of processors to handle a separate one of said plurality of tasks of the ST workload while requiring the remaining hardware threads per processor within said exclusive set of processors to remain in said snooze mode, such that said ST workload is executed on a multi-threaded processor system enabled for simultaneous execution as if said exclusive set of processors are running in ST mode without removing the remaining hardware threads per processor remaining in said snooze mode within said exclusive set of processors;

said kernel operative to apply each separate task of said ST workload to a separate local run queue of each said selected one hardware thread per processor within said exclusive set of processors; and said kernel operative to send said interrupt to wake up said selected one hardware thread per processor.

9. The system according to claim 8, further comprising:

said kernel operative to pass each said hardware thread of said exclusive set of processors to an idle process, wherein said idle process searches each said local run queue and cedes each said hardware thread of said exclusive set of processors to a hypervisor while each said local run queue associated with each hardware thread of said exclusive set of processors remains empty, wherein said hypervisor automatically returns each said hardware thread to said idle process while each said local run queue associated with each said hardware thread of said exclusive set of processors remains empty;

said kernel operative to send said interrupt to direct said hypervisor to return those selected one hardware thread per processor currently ceded to said hypervisor; and said kernel, responsive to detecting said remaining hardware threads ceded to said hypervisor, operative to place each of said remaining hardware threads in said snooze mode, wherein only a particular selection of interrupts awakens each hardware thread placed in snooze mode to return to said idle mode.

10. The system according to claim 8, further comprising:

said kernel operative to block placement of any other tasks on a remaining selection of local run queues of said remaining idle hardware threads per processor remaining in said snooze mode within said exclusive set of processors.

11. The system according to claim 8, further comprising:

said kernel operative to concurrently execute a SMT workload on a plurality of activated hardware threads of a remaining selection of non-exclusive processors from among said plurality of processors.

12. The system according to claim 8, said kernel operative to schedule said ST workload further comprising:

said kernel operative to detect a selection of processors from among said plurality of processors available for inclusion in said exclusive set of processors and said kernel operative to enable said ST workload to request construction of said exclusive set of processors with processors designated from among said selection of processors.

13. The system according to claim 8, said kernel operative to facilitate construction of an exclusive set of processors further comprising:

said kernel operative to receive said ST workload with a request for said exclusive set of processors solely defined by said number of said plurality of tasks of said ST workload;

said kernel operative to detect a selection of processors from among said plurality of processors available for inclusion in said exclusive set of processors;

said kernel operative to trigger a command to create said exclusive set of processors of a same number as said number of said plurality of tasks with processors designated from among said selection of processors; and said kernel operative to attach said exclusive set of processors to said ST workload.

14. The system according to claim 8, further comprising:

said kernel operative to receive, at a kernel layer of said SMT enabled processing system, said ST workload and a selection of processors from among said plurality of processors marked as exclusive via an application programming interface with an application layer.

15. A computer program product for managing a simultaneous multi-threaded (SMT) enabled processor system comprising a plurality of processors each activated to simultaneously execute a plurality of hardware threads, said computer program product comprising:

one or more computer-readable tangible storage devices;

program instructions, stored on at least one of the one or more computer-readable tangible storage devices, to control construction of an exclusive set of processors from among said plurality of processors to handle a plurality of tasks of an single-threaded (ST) workload in said SMT enabled processing system;

program instructions, stored on at least one of the one or more computer-readable tangible storage devices, to set a separate dispatcher for each hardware thread of said exclusive set of processors to only execute work on each local run queue associated with each said hardware thread of said exclusive set of processors;

program instructions, stored on at least one of the one or more computer-readable tangible storage devices, to drain any waiting tasks from each local run queue associated with each said hardware thread of said exclusive set of processors;

program instructions, stored on at least one of the one or more computer-readable tangible storage devices, responsive to placing each said hardware thread of said exclusive set of processors in an idle mode without any tasks to perform, to set each said hardware thread of said exclusive set of processors in a snooze mode, wherein only an interrupt awakens each said hardware thread placed in snooze mode to search an associated local run queue for waiting tasks;

program instructions, stored on at least one of the one or more computer-readable tangible storage devices, to control scheduling of said ST workload on said exclusive set of processors by selecting only one hardware thread per processor within said exclusive set of processors to handle a separate one of said plurality of tasks of the ST workload while requiring the remaining hardware threads per processor within said exclusive set of processors to remain in said snooze mode, wherein said ST workload is executed on an SMT enabled processor system as if said exclusive set of processors are running in ST mode without removing the remaining hardware threads per processor remaining in said snooze mode within said exclusive set of processors;

program instructions, stored on at least one of the one or more computer-readable tangible storage devices, to apply each separate task of said ST workload to a separate local run queue of each said selected one hardware thread per processor within said exclusive set of processors; and program instructions, stored on at least one of the one or more storage devices, to send said interrupt to wake up said selected one hardware thread per processor.

16. The program according to claim 15, said computer program product further comprising:

program instructions, stored on at least one of the one or more storage devices, to pass each said hardware thread of said exclusive set of processors to an idle process, wherein said idle process searches each said local run queue and cedes each said hardware thread of said exclusive set of processors to a hypervisor while each said local run queue associated with each hardware thread of said exclusive set of processors remains empty, wherein said hypervisor automatically returns each said hardware thread to said idle process while each said local run queue associated with each said hardware thread of said exclusive set of processors remains empty;

program instructions, stored on at least one of the one or more storage devices, to send said interrupt to direct said hypervisor to return those selected one hardware thread per processor currently ceded to said hypervisor; and program instructions, stored on at least one of the one or more storage devices, responsive to detecting said remaining hardware threads ceded to said hypervisor, to place each of said remaining hardware threads in said snooze mode, wherein only a particular selection of interrupts awakens each hardware thread placed in snooze mode to return to said idle mode.

17. The program according to claim 15, said computer program product further comprising:

program instructions, stored on at least one of the one or more storage devices, to block placement of any other tasks on a remaining selection of local run queues of said remaining idle hardware threads per processor remaining in said snooze mode within said exclusive set of processors.

* * * * *